United States Patent
Nichols et al.

(10) Patent No.: US 7,024,340 B2
(45) Date of Patent: Apr. 4, 2006

(54) AUTOMATIC COLLECTION MANAGER

(75) Inventors: William Mark Nichols, San Diego, CA (US); Roderic Murufas, Yorba Linda, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/791,034

(22) Filed: Mar. 2, 2004

(65) Prior Publication Data
US 2005/0197749 A1 Sep. 8, 2005

(51) Int. Cl.
*G06F 15/00* (2006.01)

(52) U.S. Cl. ............ 702/188; 702/188; 702/189; 244/3.15; 348/61; 348/143; 455/39; 455/67.11

(58) Field of Classification Search ......... 702/188, 702/189; 244/3.15–3.17; 89/41.06; 348/61, 348/143; 455/39, 67.11
See application file for complete search history.

(56) References Cited

U.S. PATENT DOCUMENTS

| | | | |
|---|---|---|---|
| 4,267,562 A | | 5/1981 | Raimondi |
| 4,814,711 A | | 3/1989 | Olsen et al. |
| 5,035,382 A | * | 7/1991 | Lissaman et al. ........... 244/190 |
| 5,340,056 A | * | 8/1994 | Guelman et al. .......... 244/3.16 |
| 5,581,250 A | * | 12/1996 | Khvilivitzky ............... 340/961 |
| 5,904,724 A | | 5/1999 | Margolin |
| 6,056,237 A | * | 5/2000 | Woodland .................. 244/3.15 |
| 6,119,976 A | | 9/2000 | Rogers |
| 6,211,816 B1 | | 4/2001 | Westphal |
| 6,341,248 B1 | | 1/2002 | Johnson |
| 6,424,889 B1 | | 7/2002 | Bonhoure et al. |
| 6,501,808 B1 | | 12/2002 | Zscheile, Jr. |
| 6,516,272 B1 | | 2/2003 | Lin |
| 6,535,816 B1 | | 3/2003 | Smith |
| 6,643,580 B1 | | 11/2003 | Naimer et al. |
| 6,650,972 B1 | | 11/2003 | Robinson et al. |
| 6,654,681 B1 | | 11/2003 | Kiendl et al. |
| 6,813,559 B1 | | 11/2004 | Bodin et al. |
| 2002/0161489 A1 | | 10/2002 | Johnson |
| 2003/0048357 A1 | | 3/2003 | Kain et al. |
| 2003/0066932 A1 | | 4/2003 | Carroll |

(Continued)

FOREIGN PATENT DOCUMENTS

WO     WO 03/059735 A2     7/2003

OTHER PUBLICATIONS

Netter et al., 'A Robatic Aircraft that Follows Terrain Using a Neuromorphic Eye', Oct. 2000, IEEE Article, pp. 129-134.*
Wernli, 'Trends in UUV Development with in the U.S. Navy', Dec. 2002, NRAD, pp. 841-848.*

*Primary Examiner*—Marc S. Hoff
*Assistant Examiner*—Elias Desta
(74) *Attorney, Agent, or Firm*—Robert P. Lenart, Esq.; Pietragallo, Bosick & Gordon LLP

(57) ABSTRACT

A method for the automatic collection of surveillance information by an unmanned air vehicle comprises the steps of receiving an automatic collection requirements message, determining a route for gathering requested information about a target in accordance with a collection policy, and controlling operation of an air vehicle to follow the route and gather the requested information. An automatic collection management system for an unmanned air vehicle that performs the method is also provided.

18 Claims, 2 Drawing Sheets

U.S. PATENT DOCUMENTS

2003/0114173 A1 6/2003 Carroll
2003/0167109 A1 9/2003 Clarke et al.
2003/0198364 A1 10/2003 Yonover et al.
2003/0212478 A1 11/2003 Rios

* cited by examiner

AUTOMATIC COLLECTION MANAGER

FIELD OF THE INVENTION

This invention relates to surveillance systems and more particularly to such systems that include sensors carried by unmanned air vehicles.

BACKGROUND OF THE INVENTION

There is an increased emphasis on the use of unmanned air vehicles (UAVs) for performing various activities in both civilian and military situations where the use of manned flight vehicles may not be appropriate. Such missions include surveillance, reconnaissance, target acquisition, target designation, data acquisition, communications relay, decoy, jamming, harassment, ordinance delivery, or supply.

Airborne surveillance systems typically include one or more aircraft that each carry one or more sensors for detecting, imaging or monitoring target items in an area under surveillance. Surveillance missions can be defined prior to flight by establishing definite objectives to be achieved. However, in other cases, mission objectives can change during a mission. In addition, multiple users can transmit requests for the collection of information to the aircraft in flight. This can result in conflicting requests or requests for operations that are not within the capability of a particular UAV.

There is a need for a method and system for processing the requests in an efficient manner.

SUMMARY OF THE INVENTION

This invention provides a method for the automatic collection of surveillance information by an unmanned air vehicle comprising the steps of receiving an automatic collection requirements message, determining a route for gathering requested information about a target in accordance with a collection policy, and controlling operation of an air vehicle to follow the route and gather the requested information.

In another aspect, the invention encompasses an automatic collection management system for an unmanned air vehicle comprising a receiver for receiving an automatic collection requirements message, a processor for determining a route for gathering requested information about a target in accordance with a collection policy, and a vehicle control for controlling operation of an air vehicle to follow the route and gather the requested information.

DETAILED DESCRIPTION OF THE INVENTION

Figure 1:
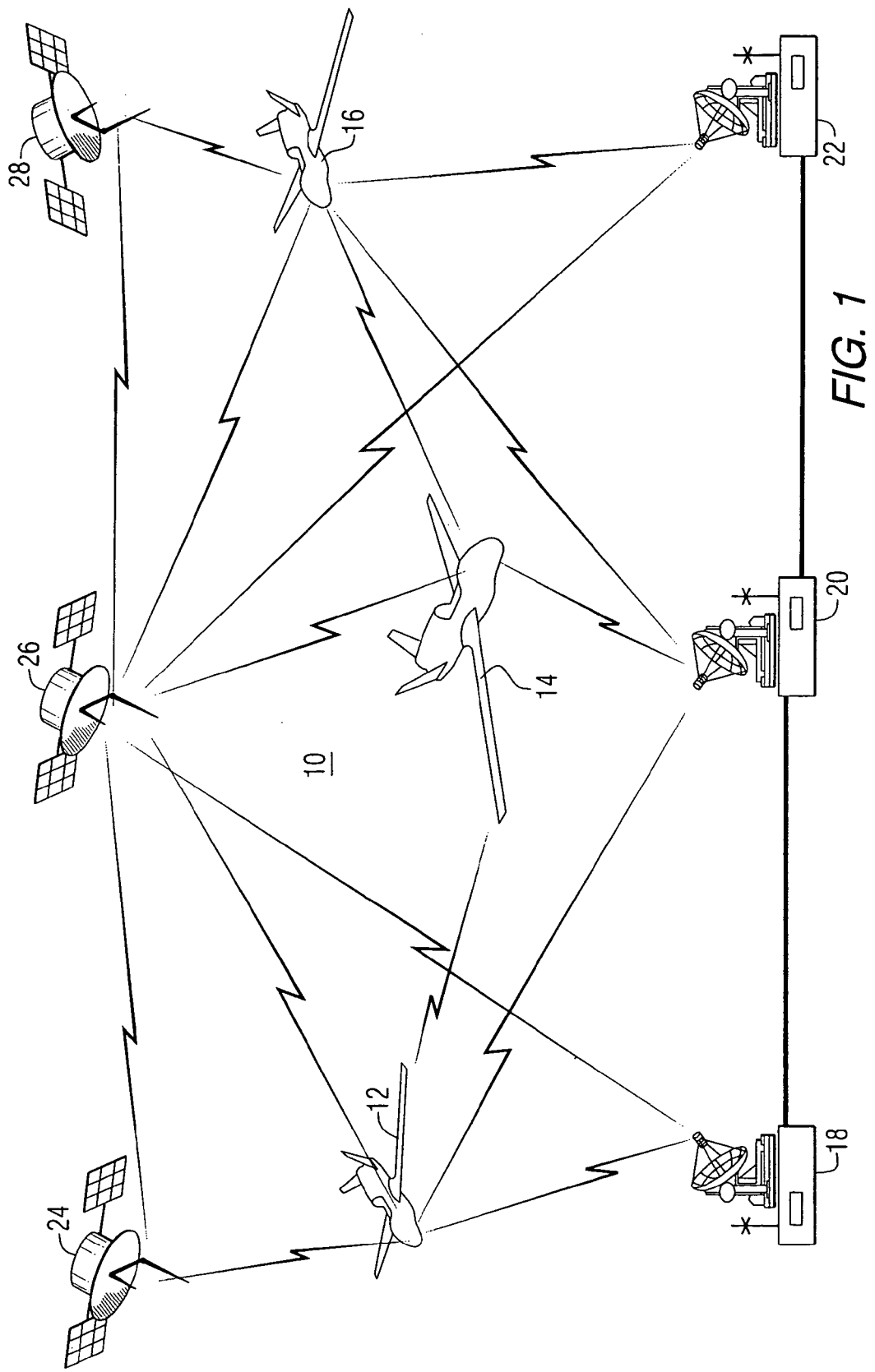
FIG. 1 is a schematic representation of a surveillance system that can include an automatic collection manager in accordance with this invention.

FIG. 1 is a schematic representation of a surveillance system 10 that can include an automatic collection manager in accordance with this invention. The surveillance system includes one or more aircraft 12, 14 and 16, also called air vehicles or platforms, each including one or more sensors for gathering information about an area under surveillance. One or more ground stations 18, 20, and 22 communicate with the aircraft. The aircraft and ground stations can also communicate with each other and with satellites 24, 26 and 28. This invention relates to the control of unmanned air vehicles and sensors, which maximizes sensor employment.

Figure 2:
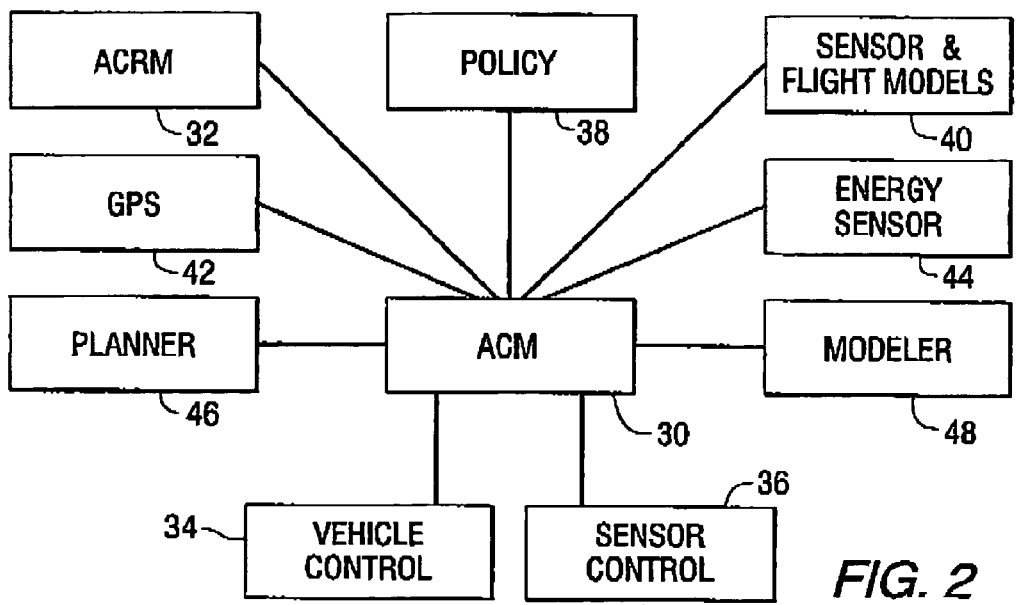
FIG. 2 is a functional block diagram of an automatic collection manager in accordance with this invention.

FIG. 2 is a functional block diagram of a UAV system that includes an automatic collection manager (ACM) 30 in accordance with this invention. Multiple users can communicate with the UAV over communications links between the various components of the system, including the UAVs, ground stations, and satellites. Suitable transmitters and receivers are provided in the system components to perform the communications. Requests for information from the UAV are provided using Airborne Collection Requirements Messages (ACRMs) 32. The ACRMs can be transmitted by one or more users to receivers on the UAVs. The ACRM can contain various types of information, including a list of targets to be imaged, the type of sensor to be used, the quality of the image required, the identity of the requestor, a destination for receiving the image, the time at which the image should be taken, and the azimuth and elevation at which the image is to be taken. In addition, the ACRM contains an indication of the priority of the image. The ACM responds to an ACRM 32 by providing control signals to vehicle control devices 34 and sensor control devices 36. The vehicle control devices can include devices for controlling the control surfaces of the UAV to control the flight of the UAV. The sensor control devices can include systems that control the operation of the sensors. The ACM receives information from a collection policy 38, and flight and sensor capability models 40.

A global positioning system sensor 42 provides the current location and altitude of the air vehicle. The current energy state of the air vehicle is provided by energy sensor 44. The energy sensor monitors the energy state of the UAV by measuring such parameters as speed, fuel, battery, altitude, wind, and temperature.

A planner 46 and modeler 48 provide additional information to the ACM. The planner and modeler can be implemented using computers, processors, or databases that provide information to the ACM. The modeler provides the expected position and energy consumption of the air vehicle given the inputs of wind, velocity, heading, current position, altitude and temperature. The modeler also models how the sensors must be positioned to obtain the required quality of an image. The planner comprises an optimization program that finds the most conservative route to a destination from which to image a target. The most conservative route is defined as the route that requires the least time, least exposure, or least fuel. The program is preferably optimized to take into account the azimuth, elevation, time, and quality of the requested image. The program finds a route that gathers the requested images in accordance with the assigned priority within the least amount of time.

The ACM provides collection plans and flight plans for air vehicles and sensors mounted on the air vehicles. After the input of the Airborne Collection Requirements Message (ACRM), the ACM calculates a route that conforms to a policy for the tasking of the ACRMs, and then submits the new route to the air vehicle controls and the new collection commands to the sensors. The policy is a set of rules that tell the vehicle: where it can fly (called the keep in zone); where it cannot fly (called the keep out zone); the altitude ranges it can fly in; the communication assets it may use; the order in which requesters are to be serviced, that is, the precedence; and the type of targets that are compatible with the sensors.

ACM performs a policy check to ensure that the policy is followed by rejecting any request that is outside its keep in zone, any request that is inside a keep out zone, any request that forces it to fly outside its altitude zone, any request outside its range, any request outside its communication coverage, any request from a unauthorized requester, or any request for targets that are not compatible with its sensors.

The system shown in FIG. 2 can be implemented using one or more computers on the UAV, wherein the computers interact with various sensors and flight control systems on the UAV. Various types of known sensors and flight control systems can be used in combination with the automatic collection manager.

Figure 3:
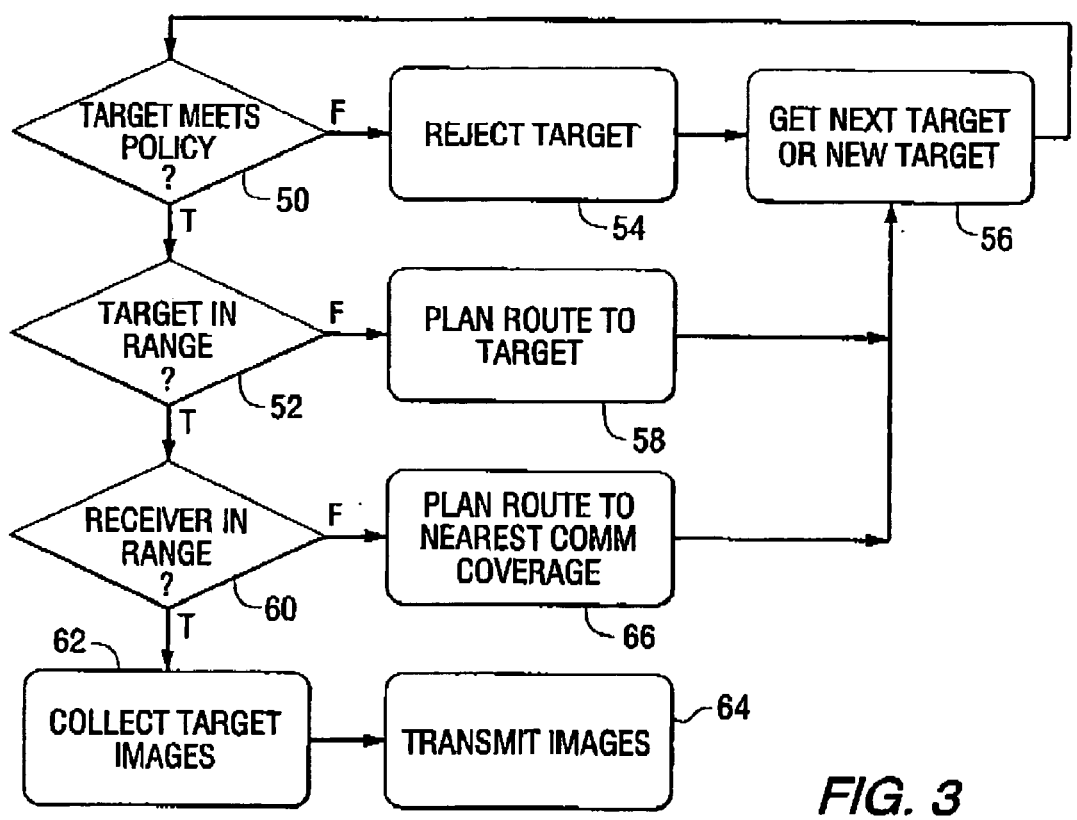
FIG. 3 is a flow diagram that illustrates the method of the invention.

FIG. 3 is a flow diagram that illustrates the operation of the automatic collection manager of the present invention. After the ACM receives an ACRM indicating that information about a particular target is to be gathered, the ACM checks to determine in the target meets policy as shown in block 50. If the target meets policy, the ACM checks to determine if the target is within range shown in block 52. If the policy is not met, the target is rejected as shown in block 54 and the UAV gets the next target as shown in block 56. If the policy is met, but the target is not within range, the ACM plans a route to the target as shown in block 58 and then gets a new target. To determine if a target is within range, the ACM uses the modeler to determine if it is possible to fly to a position that will produce an acceptable quality image from its sensors. The modeler uses the flight performance model of the vehicle; the sensor performance model of the sensors; the current energy state of the air vehicle; and the target position to determine if a target is within range. In addition, the UAV may be tasked to image a target while enroute to another target.

If the policy is met and target is in range, the ACM checks to determine if a receiver is within range as shown in block 60. If a receiver is within range, the target images are collected as shown in block 62 and the images of the target are transmitted as shown in block 64. A communications COMM plan which specifies the location and coverage of various communications devices can be contained in the planner. The COMM plan can be a plan loaded prior to flight that identifies the position of all transmission and reception devices that the air vehicle is permitted to use during its mission.

If a receiver is not within range, the ACM plans a route to an area that provides the nearest COMM coverage as shown in block 66. Then a new target can be identified.

The ACM continuously checks for new target imaging requests in the form of ACRMs. When a new ACRM is received, the ACM checks to make sure that the target meets policy. The policy may place constrains on the collection of information, such as image only at night or at day, or acquire images only in a predefined area or only use an electro-optical (EO) sensor. The policy may also dictate that images from one requester must be collected prior to collecting images from another requester, and that high priority images must be collected prior to lower priority images. If the target specified in the ACRM meets the policy, a check is made to see if the target is in range. If it is in range, the UAV will collect the image and then transmit the image or fly to an area with good reception and transmit the image.

The planning process uses multi-dimensional autorouting techniques to balance fuel, range, bandwidth, priority, and precedence in planning the route and collection plan. Auto-routing can be accomplished using any of several known auto-routing techniques, such as: A* Search, Dynamic Programming, and Genetic Programming. The key requirement is that the technique balances the multiple constraints of the problem space in a rapid fashion. The problem space can be defined in terms of limited resources such as fuel, bandwidth, and time, which must be used to gather high priority targets spread over a large area. Priority levels for the targets can be assigned on a numerical scale. As an example, consider a case where there are ten targets of medium priority level 8 in a cluster and there are two high priority targets level 10 directly east and west of the cluster. The auto router must be able to adaptively route the UAV to collect the ten level 8 targets prior to collecting the two level 10 targets, or collect the two level 10 targets and then the ten level 8 targets last depending on the policy setting for requesters precedence.

The invention provides an automatic system for autonomous conversion of collection requests into optimized routes to gather requested items, intelligence or imagery. The ACM is designed to optimize the flight path of a sensor based on flight performance model (FPM) and a sensor installation performance model (SPM). The ACM uses the FPM and SPM to position the air vehicle and sensor in the correct orientation for the requested imagery. The sensor performance model contains data and equations to define the Field of View (FOV), expected resolution for a given range, mechanical range or Field of Regard (FOR), image size, image acquisition time, and transmission bandwidth requirements, sensor boot time, sensor recycle time and terrain penetration capability.

The ACM further optimizes the sequencing of the sensor imaging events by sorting through the priorities, collection constraints, and positions of the requested imaging events. Combined with this sequencing, the ACM will optimize the storage of the collected sensor data or the transmission of the collected sensor's data. Once all images have been planned and sequenced, the ACM will produce a flight path for the sensor's platform. This flight path is verified for flight safety and then flown. Flight safety verification is accomplished by first checking to make sure all keep in and keep out zones are not violated and that all altitude bands are conformed to. A second check can be made by transmitting the proposed flight path to a remote pilot for a secondary check. In the event that a new request is made that has a higher priority than the currently planned sensor images, the ACM will insert the new sensor tasking into the plan by adjustment of the sensor platform flight path or the operation of the sensor or communication channels. For example the sensor may be orientated by swivel and roll. The sensor may also adjust its focal length, or steer or focus its beams.

An automatic collection manager for a surveillance system constructed in accordance with this invention includes means for converting sensor collection requests into flight paths for the sensor platform given a complex set of imaging constraints including, for example, timing, look angles, National Imagery Interpretability Rating Scale (NIIRS) rating, priority, bandwidth, and storage capacity.

The sensor collections can be scheduled in a prioritized sequence. The storage of collected sensor data or the transmission of the data can be optimized. New sensor collection requests can be dynamically inserted into an existing collection plan. The prioritization sequence of collection requests is used to decide which target to collect first. This prioritization relies on two factors. The first factor is the precedence of the requester and the second factor is the priority that the requester put on the target. A central authority may establish that priority ranks first followed by precedence. In this case, a level 10 target from User A and a level 10 target from User B are collected in A then B order if A has higher precedence set by the policy. If Users A and B both have the same precedence and both have level 10 targets, then the closest targets are collected first. Again this is controlled by the precedence set by the policy.

The collected images can be stored in a storage device on the air vehicle. Storage can be optimized by saving high priority or high expense target images in memory while over-writing lesser priority images or less expensive target images when memory space is a constraint. Transmission optimization can be accomplished by moving the vehicle to a location that is close enough to a communications asset to provide a higher bandwidth communications channel.

While the present invention has been described in terms of several embodiments, it will be apparent to those skilled in the art that various changes can be made to the disclosed embodiments without departing from the scope of the invention as set forth in the following claims.

What is claimed is:

1. A method for the automatic collection of surveillance information by an unmanned air vehicle, the method comprising the steps of:
   receiving an automatic collection requirements message;
   determining a route for gathering requested information about a target in accordance with a collection policy;
   dynamically inserting new sensor collection requests into an existing collection plan; and
   controlling operation of an air vehicle to follow the route and gather the requested information.

2. The method of claim 1, wherein each automatic collection requirements message includes priority and precedence information.

3. The method of claim 2, wherein the step of a determining route for gathering requested information comprises the steps of:
   determining a collection plan and a flight plan in accordance with the priority and precedence information.

4. The method of claim 3, wherein the collection plan is responsive to imaging constraints including one or more of:
   temporal constraints, look angles, National Imagery Interpretability Rating Scale rating, priority, bandwidth, and storage capacity.

5. The method of claim 1, wherein the step of a determining route for gathering requested information comprises the steps of:
   determining if the target is within range; and
   planning a route to the target if the target is within range.

6. The method of claim 1, wherein the step of a determining route for gathering requested information comprises the steps of:
   determining if a receiver is within range; and
   if a receiver is not within range, planning a route to an area where a receiver is within range.

7. An automatic collection management system for an unmanned air vehicle comprising:
   a receiver for receiving an automatic collection requirements message;
   a processor for determining a route for gathering requested information about a target in accordance with a collection policy; and
   a vehicle control for controlling operation of an air vehicle to follow the route and gather the requested information;
   wherein the processor dynamically inserts new sensor collection requests into an existing collection plan.

8. The system of claim 7, wherein each automatic collection requirements message includes priority and precedence information.

9. The system of claim 7, wherein the processor determines a collection plan and a flight plan.

10. The system of claim 9, wherein the collection plan is responsive to imaging constraints including one or more of:
    temporal constraints, look angles, National Imagery Interpretability Rating Scale rating, priority, bandwidth, and storage capacity.

11. The system of claim 7, wherein the processor determines if the target is within range and plans a route to the target if the target is within range.

12. The system of claim 7, wherein the processor determines if a receiver is within range; and if a receiver is not within range, plans a route to an area where a receiver is within range.

13. An automatic collection management system for an unmanned air vehicle comprising:
    means for receiving an automatic collection requirements message;
    means for determining a route for gathering requested information about a target, and new sensor collection requests dynamically inserted into an existing collection plan, in accordance with a collection policy; and
    means for controlling operation of an air vehicle to follow the route and gather the requested information.

14. The system of claim 13, wherein each automatic collection requirements message includes priority and precedence information.

15. The system of claim 13, wherein the means for determining a route for gathering requested information determines a collection plan and a flight plan.

16. The system of claim 15, wherein the collection plan is responsive to imaging constraints including one or more of:
    temporal constraints, look angles, National Imagery Interpretability Rating Scale rating, priority, bandwidth, and storage capacity.

17. The system of claim 13, wherein the means for determining a route for gathering requested information determines if the target is within range and plans a route to the target if the target is within range.

18. The system of claim 13, wherein the means for determining a route for gathering requested information determines if a receiver is within range; and if a receiver is not within range, plans a route to an area where a receiver is within range.

* * * * *